Aug. 14, 1951
S. J. MATHEWS, JR., ET AL
COMBINATION ROTARY TABLE AND
HYDRAULICALLY OPERATED SLIPS
Filed March 8, 1948
2,564,119
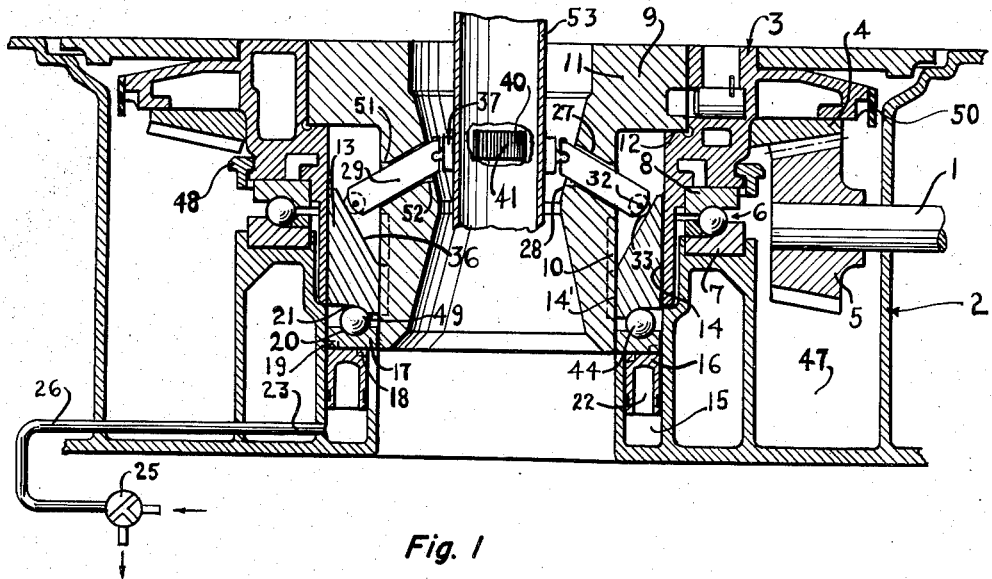
Fig. 1
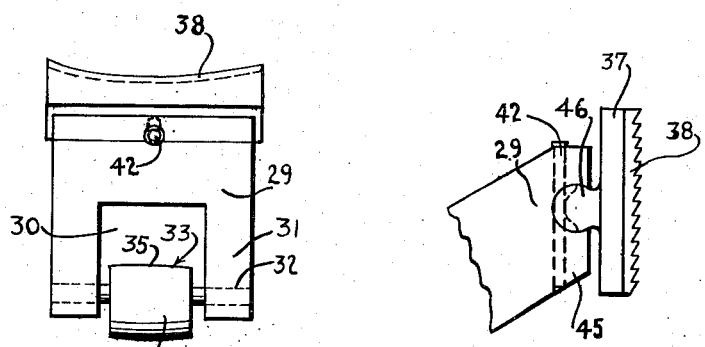
Fig. 2
Fig. 3
Charles R. Reglin
S. J. Mathews Jr.
Seldon P. Hurley
Vernon C. H. Richardson
INVENTORS
BY Lester B. Clark
   Ray L. Smith
ATTORNEYS Patented Aug. 14, 1951

2,564,119

UNITED STATES PATENT OFFICE 2,564,119

COMBINATION ROTARY TABLE AND HYDRAULICALLY OPERATED SLIPS

S. J. Mathews, Jr., Gainesville, Vernon C. H. Richardson, Bellaire, Selden P. Hurley, Pasadena, and Charles R. Reglin, La Porte, Tex.

Application March 8, 1948, Serial No. 13,537

3 Claims. (Cl. 255—23)

This invention relates to a drilling apparatus which consists of a machine for rotary drilling which has integrally therein hydraulically positioned slip jaws.

It is an object of this invention to provide an apparatus of this class in which a bowl is rotatable with the rotary table of the machine.

It is a further object of this invention to provide an apparatus of this class in which a bowl having an upwardly and outwardly tapered cam surface is vertically positioned by an annular piston to move slip segments which are flotable on the cam surface outwardly or inwardly so that the jaws thereof may grasp various diameter of pipe.

It is a further object of this invention to provide a device of this class in which the rotary table is provided with a slotted bushing or collet integral therewith to serve as a guide for slip segments which are floatable on the tapered cam surface of the bowl of the device.

It is yet another object of this invention to provide an apparatus of this class in which the slip jaws are rockable about the inner slip segment ends on which they are mounted so as to provide flexibility of the gripping operation.

It is also an object of this invention to provide a device of this class in which the slip jaws which grip the pipe have teeth thereon which extend both radially and longitudinally of the pipe axis.

It is also an object of this invention to provide a device of this class in which the annular piston which vertically positions the bowl is capped by the lower race of a ball bearing assembly.

Other and further objects of this invention will become apparent upon referring to the drawing in which Fig. 1 is a sectional elevation of the apparatus.

Fig. 2 is a fragmentary elevation which shows the details of the slip segment and slip jaw construction.

Fig. 3 is a fragmentary plan view which shows further details of the slip segment and slip jaw construction.

A source of power, not shown, drives a shaft 1 which is journalled in the frame 2 of the machine. The table 3 is supported in the frame and has a gear 4 rigidly connected thereto to be driven by the pinion 5 on the shaft 1. Easy rotation of the table is assured by the ball bearing assembly 6, the lower race 7 thereof being fixed in the frame 2 and the upper race 8 being rotatable with the table 3. A bushing or collet 9 is inserted, pressed, or connected into the open center of the table 3 so that the flange 11 thereof rests on the shoulder 12. A bowl or cam 13 having an internally tapered, upwardly and outwardly extending cam surface 36 is slidable against the wall 14 of the table and the collet 9 has a keyway 10 therein in which slide ears 14' which are on the bowl 13 at the base thereof. The frame 2 has an annular groove 15 below the bowl 13 and an annular piston 16 is slidable in this groove. An annular ring 17 is rigidly fixed to the piston 16 as a part thereof, as by the interfitting lugs and grooves 18 and 19. The ring 17 has a dished upper central section 44 to form the lower race of a ball bearing assembly, the upper race being formed by relieving the lower face 21 of the tapered bowl 13. The piston 16 has a hollow portion 22 therebeneath and the frame 2 has a fluid line 23 which passes thereinto and communicates with this hollow portion.

A source of hydraulic power, not shown, operates through the three-way valve 25 and the line 26 to force fluid through the line 23 into the piston 16.

The collet 9 has four slots 27 equally spaced peripherally thereof extending diagonally upwardly through the wall thereof to open into the collet bore as open center 28.

A slip segment 29 is provided for each of the slots 27 in the downwardly extending portion of the collet. These segments have a relieved portion 30 to form the bearing arms 31 in which is journalled the shaft 32 of the roller units 33. These roller units 33 have a roller element 34 which has an arched surface 35 to slide along the inner wall or cam surface 36 of the bowl 13. The ends 45 of the segments 29 are bored to pivotally receive the cylindrically contoured rocker or slip jaw bases 46 on which are mounted the rocker or slip jaws 37. These jaws have upwardly pointing teeth 38 on the face thereof adapted to grasp and hold pipe so that the pipe does not slide downwardly into the well.

Alternate jaws 40 may be provided with teeth 41 having the edges thereof extending vertically to grip pipe against rotation, or it may be preferable to provide a single jaw with both types of teeth 41 and 38. A pin 42 extends through each segment 29 centrally thereof to prevent the jaw bases 46 from sliding laterally in the slips 29.

The operation of the apparatus is obvious since the piston 16 may be moved vertically upward to any desired position within the limitations of the structure to bring the rocker jaws 37 into gripping contact with any diameter of pipe which may be inserted through the rotary table, the rockable feature of the jaws then permitting the gripping of pipes having irregularities in the diameter thereof.

It is especially pointed out that the collet slots 27 are larger than the segments 29 and are relieved at 51 and 52 to permit the segments 29 about 5 degrees toggle action so that when the jaws 37 grasp the pipe 53, the load of the pipe is carried by both the collet 9 and the bowl 13.

To facilitate smooth running of the apparatus the frame 2 has a chamber 47 formed therein to provide an oil bath, not shown, for the pinion 5 so that the meshing of the gear and pinion teeth may eject oil therefrom downwardly past the hold-down ring 48 and through the ball bearing assembly 6 to the lower ball bearing assembly 49 between the bowl 13 and the ring 17 upon the piston 16. A protective shield 50 prevents the oil from being splashed upwardly around the upper plate of the frame 2.

Broadly this invention considers an apparatus in the nature of a machine employed in the rotary method of drilling wells having a table in which adjustably positioned slip jaws form an integral part of the machine assembly. In this apparatus the positioning of the jaws is obtained by any source of power, as hydraulic power, which may be applied to easily elevate or lower the jaws to grip various diameter pipes, the source of power being adapted to firmly hold the jaws in engagement with the pipe throughout any desired gripping operation.

What is claimed is:

1. A machine for a drilling rig employed in the rotary method of drilling wells and comprising, a frame mounted around the top of the well bore, an open centered table rotatable on said frame and having a downwardly extending central portion, slots through the walls of said portion, a bowl surrounding said portion and adapted to rotate therewith and to move axially thereof, the inside of said bowl providing an upwardly and outwardly tapered cam surface, slip segments slidable on said surface and extending through said slots and having jaws on the inner segment ends, and piston means in said frame adapted to support said bowl for rotation and to move said bowl vertically to force said slip jaws inwardly to grasp a pipe string suspended vertically from said rig through said open center.

2. A machine for a drilling rig employed in the rotary method of drilling wells and comprising, a frame mounted around the top of the well bore, an open centered table rotatable on said frame and having a downwardly extending central portion, slots through the walls of said portion, a bowl surrounding said portion and adapted to rotate therewith and to move axially thereof, the inside of said bowl providing an upwardly and outwardly tapered cam surface, slip segments slidable on said surface and extending through said slots and having jaws pivotal on the inner segment ends, and piston means in said frame adapted to support said bowl for rotation and to move said bowl vertically to force said slip jaws inwardly to grasp a pipe string suspended vertically from said rig through said open center.

3. A machine for a drilling rig employed in the rotary method of drilling wells and comprising, a frame mounted around the top of the well bore, an open centered table rotatable on said frame and having a downwardly extending central portion, upwardly and inwardly extending slots through the walls of said portion, a bowl surrounding said portion and adapted to rotate therewith and to move axially thereof, the inside of said bowl providing an upwardly and outwardly tapered cam surface, slip segments slidable on said surface and extending through said slots and having jaws on the inner segment ends, and piston means in said frame adapted to support said bowl for rotation and to move said bowl vertically to force said slip jaws inwardly to grasp a pipe string suspended vertically from said rig through said open center.

S. J. MATHEWS, Jr.
VERNON C. H. RICHARDSON.
SELDON P. HURLEY.
CHARLES R. REGLIN.

REFERENCES CITED

The following references are of record in the file of this patent:

UNITED STATES PATENTS

| Number | Name | Date |
| --- | --- | --- |
| 1,009,970 | Hyle | Nov. 28, 1911 |
| 1,044,349 | Chapman | Nov. 12, 1912 |
| 1,314,960 | Headrick et al. | Sept. 2, 1919 |
| 1,341,410 | Black | May 25, 1920 |
| 1,341,702 | Black | June 1, 1920 |
| 1,517,979 | Greathouse | Dec. 2, 1924 |
| 1,559,932 | Boyen | Nov. 3, 1925 |
| 1,812,721 | Sheldon | June 30, 1931 |
| 2,317,306 | Smith | Apr. 20, 1943 |